Nov. 14, 1939.   J. E. BROSSEAU   2,179,811
TEMPERATURE RESPONSIVE CONTROL MECHANISM
Filed April 21, 1936   2 Sheets-Sheet 1
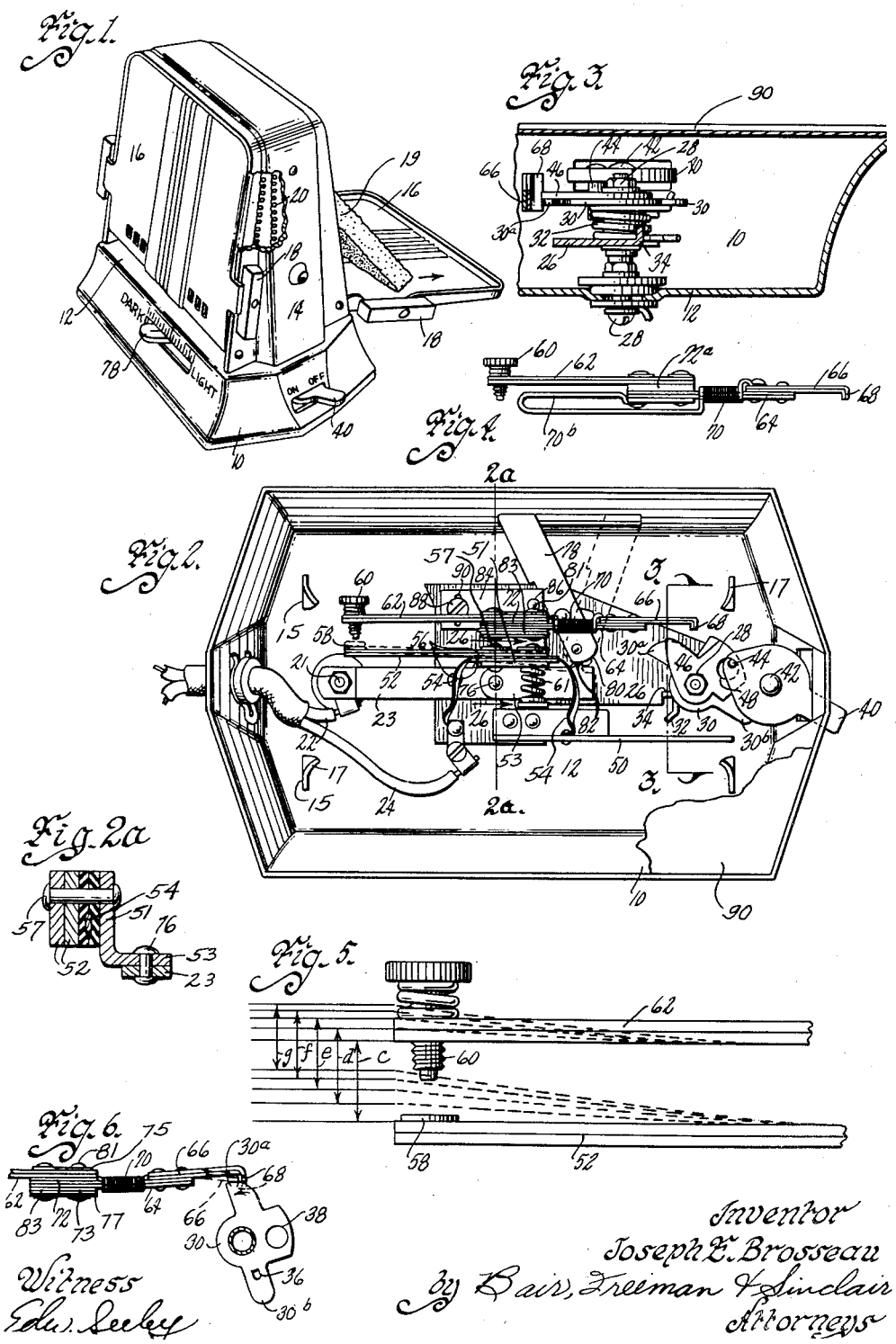

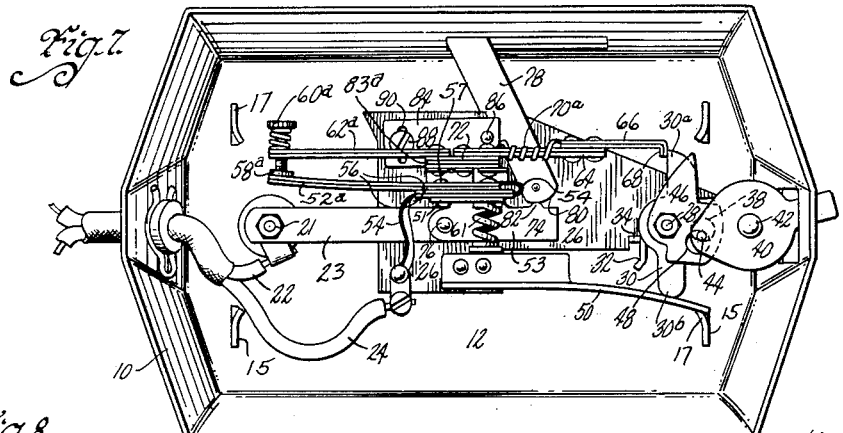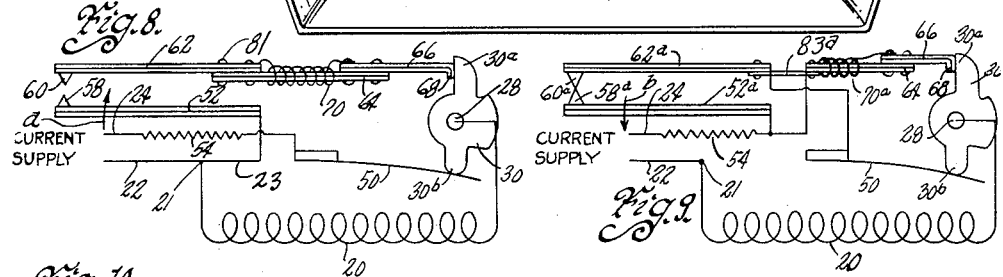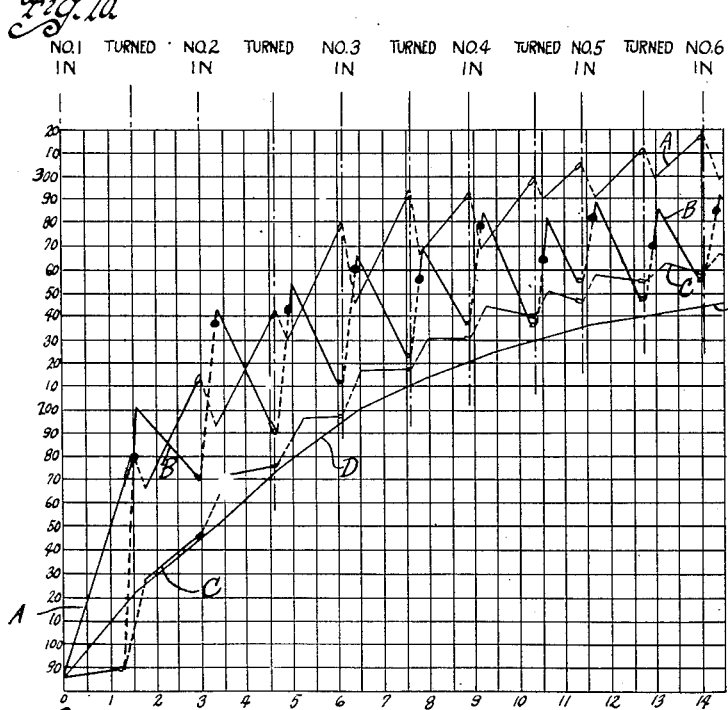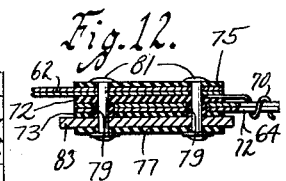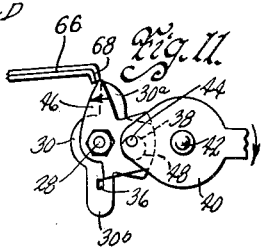

Patented Nov. 14, 1939

2,179,811

UNITED STATES PATENT OFFICE 2,179,811

TEMPERATURE RESPONSIVE CONTROL MECHANISM

Joseph E. Brosseau, West Chicago, Ill.

Application April 21, 1936, Serial No. 75,596

14 Claims. (Cl. 219—19)

The invention relates to a temperature responsive control mechanism, and its general object is to provide an improved control mechanism for automatically varying the operating periods of various devices or appliances particularly when these periods follow each other successively to maintain a predetermined degree of uniformity in the effectiveness of the controlled apparatus throughout the successive operating periods.

The invention is particularly suitable for use with appliances intended for use in successive operating cycles and having a primary source of heat such as an electrically energized heating element as, for example, toasters or the like. As is well known when appliances of this character are operated a number of times with relatively short intervals between successive operations, the temperatures of the various parts and particularly that of the heating chamber increase gradually until a substantially constant maximum temperature is reached. In order to maintain uniform effectiveness in the operating periods occurring during this heating up process, it will be apparent that the amount of energy supplied to the heating element of the appliance during any given period must be varied in proportion to the residual heat of the appliance at the beginning of that period.

One of the most convenient methods of varying the amount of energy supplied to the heating element consists in varying the length of the operating periods of the appliance; that is, the interval during which current is supplied to the heating element. It is therefore the primary object of my invention to provide a control mechanism particularly adapted for use with appliances of the above character, which is simple and inexpensive to manufacture, efficient and reliable in operation, and capable of controlling the operating periods of the appliance with extreme accuracy and uniformity according to the varying requirements of the appliance.

A further object of the invention is to provide a control mechanism for an electric switch or other control device intended for operation repeatedly in successive operative cycles, in which the operation to be performed is accomplished by the use of a thermal element arranged within a confined space and operable by the application of heat thereto, and in which as an incident to the operation of the element in one cycle the operation thereof in the succeeding cycle is modified to compensate for a gradual increase in the temperature of the space.

Another object is to provide a control mechanism for an appliance or the like having a primary source of heat and a switch or other control device for controlling said source repeatedly in successive operative cycles of the appliance, in which the operation to be performed is accomplished by a thermal relay subject to the heat of the appliance derived from said source, the operation of which, as an incident to the operation of the element in one cycle, is modified to compensate for a gradual increase in the temperature of the appliance.

Another object is to provide an improved control mechanism for automatically timing successive operating periods of an electrical appliance or the like in accordance with the requirements thereof embodying novel timing means including a pair of spaced timing elements adapted to be moved into operative engagement with each other to define the timing periods, together with means for automatically varying the relative spacing of th elements in accordance with the condition of the appliance.

Another object is to provide improved mechanism for controlling the current supply switch of an electrical appliance or the like including a thermally operated switch actuating device having an electrically energized heating element and a thermally actuated timing device for controlling the energization of the heating element.

Another object is to provide an improved control mechanism for operation in a variably heated space including an actuating element and a control element adapted to be operated in timed relation thereto to control successive operations of the actuating element.

A further object is to provide an improved thermal relay for controlling successive operations of an electrical appliance, comprising a heating element and a plurality of thermal elements operatively associated with the heating element and operable thereby in a predetermined timed relation.

Still another object is to provide an improved thermally actuated mechanism for controlling successive operations of an electrical appliance or the like embodying means for permitting substantially immediate recycling of the appliance after each operation.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of a toaster with my timer applied thereto.

Figure 2 is a bottom plan view of the same on an enlarged scale, showing the timer in cold position.

Figure 2a is an enlarged detail sectional view on the line 2a—2a of Figure 2.

Figure 3 is an enlarged detail sectional view on the line 3—3 of Figure 2, the toaster base being inverted.

Figure 4 is a view of a portion of Figure 2 showing a modified construction.

Figure 5 is an enlarged view of a portion of Figure 2 showing a temperature responsive timer element and a temperature responsive compensating element in their "cold" positions, and by dotted and dimension lines showing respectively different positions of the timer element and compensating element as a result of temperature increase and the relative distance between the two as a result thereof.

Figure 6 is a view of a portion of Figure 2 showing a latch for the switch in releasing position, and by dotted lines the position of a latch position compensating element after latch release has been effected.

Figure 7 is a bottom plan view of a modified construction utilizing a different circuit arrangement.

Figure 8 is an electrodiagrammatical view of the circuit arrangement for Figure 2.

Figure 9 is a similar view of the circuit arrangement for Figure 7.

Figure 10 is a chart showing the temperature of the various elements of the timer structure during a period of operations.

Figure 11 is a view similar to a portion of Figure 2 showing a mechanical latch releasing mechanism being operated; and Figure 12 is an enlarged sectional view showing the support of the elements 62 and 64 of Figure 2 on the bracket 83.

In the accompanying drawings I have used the reference numeral 10 to indicate the base of an electric appliance, the top of the base being indicated at 12. I have shown my invention applied to the control of an electric bread toaster although it is applicable to the control of various other devices. Also, I have shown the control mechanism as being confined within a casing formed by the base of the appliance, but, of course, such enclosing casing may be formed separately from the base.

The toaster herein shown is of the type comprising a housing 14 mounted on the base 10 as by slot and tongue connections 15—17, and provided with hinged doors 16 on opposite sides so designed as to be utilized in turning the bread in a well known manner. The doors 16 have handles 18 for opening and closing them. The housing, together with the doors 16 defines two toasting chambers to which heat is applied by an electric heating element 20. At 19 in Figure 1 is shown a piece or slice of bread in the act of being turned.

As herein shown for purposes of illustration, my improved control mechanism is in the nature of a timer comprising a base plate 26 supported relative to the top 12 by means of bolts 21 and 28. These bolts may also serve as terminals for the heating element 20, the current for which is supplied through supply wires 22 and 24.

To control the energization of the heating element 20, I provide a switch including a switch blade 30 pivoted on the bolt 28, and a switch blade 50 secured to the base 26. The blade 50 is of leaf spring construction. The blade 30 is normally held disengaged from the blade 50 by means of a coil spring 32, one end of which engages a stationary lug 34 on the base plate 26, the center of which is coiled around the bolt 28 as shown in Figure 3, and the other end of which extends through a perforation 36 (see Figure 6) in the blade 30.

For swinging the blade 30 from the position of Figure 2, to the position of Figure 7, I provide a switch lever 40 pivoted on a pin 42. The lever 40 carries a pin 44 extending through an opening 38 in the switch blade 30. By swinging the lever 40 counter-clockwise from the position of Figure 2 to the position of Figure 7, the blade 30 is rotated clockwise to a latched position, wherein a latch lug 30a thereof is held latched by a second latch lug 68, which will hereinafter be described. The opposite end 30b of the switch blade 30 contacts with the switch blade 50 bending it to the position of Figure 7, and establishing the circuit for the heating element 20 when in this position.

For manually releasing the latch 68 I provide a latch releasing plate 46 also pivoted on the bolt 28 and having an opening 48 receiving the pin 44. In Figure 2 the openings 38 and 48 are alined. In Figure 7 they are out of alinement, the latch releasing plate 46 permitting the latch lug 68 to retain the switch in closed position. By swinging the switch lever 40 from the position of Figure 7 to the position of Figure 11, however, the pin 44 will engage the edge of the opening 48 and swing the latch releasing plate 46 to the position shown in Figure 11, thus manually raising the latch lug 68 out of engagement with the latch end 30a of the switch blade 30, and thereupon permit the spring 32 to rotate the switch blade to open circuit position.

My timer structure further includes a temperature responsive timer element 52, preferably of bimetal construction and anchored to a vertical flange 51 of a horizontally arranged adjusting plate 53. The plate 53 is pivoted as at 76 to a blade 23 extending from the terminal bolt 21 and secured to the base member 26. The element 52 is secured to the flange 51 by rivets 57, insulation such as sheets of mica 56 being interposed between the two, and a heater 54 comprising a strip of resistance ribbon interposed between the sheets of mica for heating the element 52 when the heater is energized, and thus causing it to gradually warp for controlling purposes, which will hereinafter be described.

The plate 53 is constrained by a spring 61 to assume the full line position of Figure 2 with a hump 82 thereof contacting with a cam face 80 of an adjusting lever 78. When the lever is adjusted to the dotted position of Figure 2, the element 52 will be swung to the dotted position illustrated for changing the timing period to minimum adjustment.

A temperature responsive compensating element 62 is provided which is also a strip of bimetal. The elements 52 and 62 carry contacts 58 and 60, the contact 60 being adjustable for changing the distance between them for changing the timing period. This is a factory adjustment, the lever 78 being the only one used by the operator for changing the timing period.

I provide a bimetallic latch releasing element 64, and both it and the element 62 are supported on a vertical flange 83 of a plate 84 with a strip of insulating material 72, such as mica or the like, interposed between them and separating them electrically. The material 72 also introduces a thermal lag by which the operation of the element 62 is delayed until after the latch lug 68 is tripped, as will hereinafter appear.

Heat is to be transferred during the operation of the timer from the latch releasing element 64 to the compensating element 62, the rate of heat transfer or the thermal lag being determined by the insulation 72 and by a second insulator 73 interposed between the element 64 and the bracket 83. The purpose of this is to prevent leakage of heat to the bracket, particularly during the heat-up process. A third strip of mica 75 is placed on the outer side of the element 62 for the purpose of assisting the element in retaining its heat. A fourth strip 77 on the outer side of the bracket 83 serves mainly as an insulator for the rivets 81 which hold the parts assembled.

In order to insulate the rivets from the thermal element 64, insulating bushings 79 are used. These bushings are necessary in order to eliminate any possibility of short circuiting the heating coil 70 by electric contact through the rivets 81 to the element 62.

The adjusting plate 84 is pivoted on a rivet 86 and by means of a screw and slot connection 88—90 may be adjusted at the factory to secure proper positioning of the elements 62 and 64 relative to the element 52 and the switch latch 30a respectively.

The latch releasing means comprises, in addition to the element 64, a temperature responsive element 66, terminating in the latch lug 68. A second heater is provided at 70 preferably wound around the latch releasing element 64 with suitable insulation to prevent short circuit.

As a modified means for causing the compensating element 62 to laggardly respond to heating of the latch releasing element 64, I may provide an auxiliary heater 70b (see Figure 4) adjacent the compensating element 62, yet sufficiently far from it so that the heater 70 will have, upon energization, sufficient time to insure unlatching of the latch 68 before the heat radiated from the heater 70b affects the compensating element 62 to such an extent that the contact 60 is separated from the contact 58. With this construction additional insulation is provided as at 72a to substantially minimize the transmission of heat from the element 64 to the element 62.

*Practical operation*

In Figure 8 I illustrate the circuit for the timer shown in Figure 2, the main switch being closed. With the parts in the position illustrated, the circuit can be traced from the wire 22 through the heating element 20, then through the switch blades 30 and 50 to the wire 24, after passing through the first heater 54.

Upon the closure of the circuit, the heating elements 20 and 54 are energized, the former operating to toast the bread in the toaster and the latter warping the thermal element 52 in a direction tending to move the contact 58 into engagement with the contact 60. Upon the contacts 58 and 60 engaging, current will also flow from the wire 22 to the switch plate 50 through the following elements: 23, 52, 58, 60, 62, 70, 66, 68 and 30. This energizes the heater 70 at full line voltage and the heat generated thereby warps the element 64 to move the latch 68 into unlatching position as illustrated in Figure 6.

As the latch 68 is moved out of the path of the latch lug 30a the plate 30 is released to the action of its spring 32 which rotates it to the disengaged or "off" position to interrupt the supply of current to the heating elements 20, 54, and 70. Switch lever 40 is simultaneously snapped back to the "off" position, thus informing the operator that the toasting period is finished. The operator may then open and close the door 16 to reverse the bread 19 in the toaster and again move the switch lever 40 to the "on" position to resume toasting.

As soon as the latch 68 is released, as shown in Figure 6, the current is turned off and the various heating elements are deenergized, but the latch releasing element 64 may continue to warp in the unlatching direction due to the residual heat of the heating element 70. To compensate for this overrun of the element 64, the element 66 on which the latch 68 is formed, is positioned so as to warp in a direction opposite to the warping of the element 64. Heating of the element 66 is effected by conduction from the element 64 so that it operates laggardly with respect to the latter element. By properly proportioning the compensating element 66, it may be made to respond to the heat conducted from the element 64 substantially simultaneously with the tripping of the latch. Thus, as element 64 continues to warp and move the latch 68 away from latching position, element 66 warps in the opposite direction to move the latch toward latching position so that the time period during which the latch is ineffective to engage the plate 30 is reduced to a minimum, thereby permitting substantially immediate reclosure and relatching of the switch to initiate the succeeding toasting operation.

During the interval between successive toasting operations, the timing elements are automatically adjusted to compensate for the residual heat of the toaster so that the bread will be toasted to exactly the same degree in each operation. This adjustment is effected by varying the relative spacing of the contacts 58 and 60 through the warping action of the timing element 52 and the compensating element 62. As the energizing current for the heater 54 is shut off upon the opening of the main switch, the timing element begins to recede immediately, the amount of recession depending, of course, upon the length of the interval during which the heater is deenergized. The compensating element 62, however, is warped in a direction such as to move the contact 60 away from the contact 58 by the heat conducted from the element 64 through the thermal insulator 62.

The amount of heat received by the element 62 and the degree of lag between its operation and the operation of the element 52 is dependent upon the characteristics of the insulators 72 and 73. In the present instance, these insulators are so proportioned that the transfer of heat to the member 62 is delayed until after the opening of the main switch and the amount of heat transferred is just sufficient to warp the element to a position in predetermined relationship to the position of the member 52. It will be apparent, therefore, that the above factors may be varied within wide limits to suit the requirements of different appliances by employing an insulator having suitable characteristics.

In the normal operation of the appliance;

that is, with the heating periods following each other in quick succession, the residual heat of the appliance and the timing and compensating elements prevent the elements from receding to their starting positions after each operating period. The elements accordingly assume a more and more warped position as indicated by the dotted lines in Figure 5. By reason of the lag in the operation of the compensating element, the relative spacings of the elements as indicated by the dimension lines c, d, e, f, and g will be progressively decreased. In other words, the distance through which the contact 58 must move in order to engage the contact 60 will decrease progressively with the increase in the residual heat of the appliance until the appliance has reached a maximum constant temperature. To further stabilize the ambient temperature affecting the elements 52, 62, 64 and 66 I preferably provide a cover plate 90 on the bottom of the toaster base 10 which encloses the space within the toaster base in which the control mechanism is mounted.

The variation in the spacing of the contacts 58 and 60 determines the time required for the contacts to close when a heating period is initiated, and thus determines the length of this period. As the residual heat of the appliance increases, the length of each heating operation is decreased accordingly, until a constant temperature point is reached after which it is only necessary to compensate for variations in the length of the idle periods of the appliance and for changes in the material being heated.

In order to more clearly illustrate the manner in which the various elements cooperate in the timing of the appliance, the relative temperature changes of the several thermal elements in successive operations of the appliance have been shown in graphic form in Figure 10 of the drawings. Referring particularly to this figure, the horizontal lines represent time in minutes, while the vertical lines represent temperature in degrees Fahrenheit. "No. 1 in, turned, No. 2 in, turned, etc.", indicate the points at which the first and second heating operations are initiated for successive operations of the appliance. More particularly, they refer to the operation of toasting successive pieces of bread wherein one side of the bread is initially toasted, the bread is then turned and the other side toasted, followed by the substitution of a new piece of bread for the completely toasted piece.

To operate the toaster the bread is placed in the toasting chamber and the switch 40 is manually set to the "on" position. After the lapse of the necessary time as determined by the setting of the adjusting arm 78, the timing mechanism automatically releases the switch and thus terminates the toasting or heating operation. This operating cycle is repeated as often as desired, the heating periods being varied automatically as the residual heat of the appliance increases so that a uniform product is turned out without necessitating any adjustment whatever of the timing mechanism. Referring particularly to Fig. 10, the graph line A indicates the temperature of the element 52 in the successive operations of the toaster. The graph line B represents the temperature of the latch compensating element 66, while the graph line C represents the temperature of the timer compensating element 62. The ambient temperature of the space in which the control mechanism is located and corresponding to the residual heat of the toaster is indicated by the substantially smooth curved line D.

The lines A, B, and C are broken into solid, double and dotted sections, the solid sections indicating the time during which the current is passing through the heating element 20, the double sections indicating the time during which the current is also passing through the heater 70 and the dotted sections indicating the time during which the current is turned off.

It will be observed that the line A rises when the current is on and falls during the period the current is off, throughout the operation of the appliance. This indicates that the element 52 moves toward position for the contact 58 to engage the contact 60 while the current is on and while the heater 70 is being heated, and then recedes while the main switch is in open circuit position. The amount of recession, however, is smaller than the advance, so that the element 52 is progressively advanced, as indicated in Figure 5, on successive operations of the appliance.

The line B indicates an initial gradual rise in temperature of the element 66 due to the residual heat of the appliance, followed by a substantial rise in temperature due to transfer of heat from the latch tripping element 64 beginning immediately after the latch is tripped to interrupt the supply of current to the heater. The lag in the operation of the element 66 insures proper tripping of the latch and the subsequent heating of the element warps it toward latching position so that the succeeding operating cycle may be initiated without waiting for the element 64 to cool down.

The temperature of the timer compensating element 62 as represented by the line C, rises gradually with the initial heating of the appliance until after the current is shut off at the end of the first cycle, after which it rises relatively steeply by reason of the heat conducted from the element 64. Due to the thermal lag introduced by the insulating element 72 interposed between the elements 64 and 62, the response of the element 62 to the action of the heater 70 is delayed as indicated by the graph. Thus the element is conditioned in one cycle of the device to vary the operating period in the succeeding cycle.

During the succeeding heating operation the temperature of the element 62 increases only slightly, this being due to conduction of heat from the element 64 and from the heating chamber of the appliance. It will be observed that in the successive operations of the appliance the temperature variations of the element 62 become progressively smaller as the residual heat of the appliance increases. Element 62 is thus progressively warped out of its normal position so that the spacing of the contacts 58 and 60 is progressively decreased in succeeding operations of the appliance, as hereinbefore explained.

It will be seen from the foregoing that, in each operating period, I utilize the movement of the timing element 52 as a primary means of controlling the amount of energy supplied to the appliance. In succeeding operations the control action of this element is modified by the movement of the compensating element 62 so that the energy supply is varied automatically in direct proportion to variations in the residual heat of the appliance. The timing and compensating elements cooperate through the medium of the contacts 58 and 60 to energize the heater 70 and the heat generated thereby is utilized to interrupt the supply of current to the appliance and to adjust the position of the compensating element 62 and thus vary the relative spacing of the contacts in successive operating periods. The compensating element 66 operates to permit substantially immediate recycling of the appliance so that it may be operated efficiently and with practically no loss of time.

By reason of the advantageous combination and arrangement of the various parts of the control mechanism, the thermal elements being substantially unrestrained by frictional resistance are enabled to respond quickly and accurately to relatively small temperature changes. Moreover, the elements may be operated within a relatively narrow temperature range and only slightly above the temperature of the casing in which they are enclosed thus materially increasing the useful life of the elements and rendering them extremely sensitive to any variation in the residual heat of the appliance and its contents so that uniform effectiveness in every operating period is insured. The degree of sensitiveness provided by the control mechanism comprising the invention may be readily seen by reference to the graph shown in Figure 10. Referring to this figure, it will be observed that the initial toasting period covers approximately 90 seconds. During this period, the entire mass of the piece of bread is heated up and one side is browned to the desired condition. The second toasting period is substantially shorter than the first period. Since the bread was heated through in the first toasting period, it is only necessary to apply enough heat to bring the untoasted side to the same condition as the toasted side and the shortened interval is sufficient for this purpose. The toasted piece of bread is then removed and a fresh piece placed in the toaster. Due principally to the time required to make this change and to the decrease in residual heat by reason of the insertion of the cold piece of bread, the control mechanism operates to increase the length of the third toasting period as compared with the second. This period, however, is somewhat shorter than the first period and desirably so, since the residual heat of the toaster itself has increased slightly. The fourth period is likewise shortened, and so on, through succeeding periods.

In Figures 7 and 9 I show a modified construction in which the contacts 58a and 60a are normally engaged. The elements 52a and 62a are connected so that they shunt a heater 70a so that the circuit upon closure of the switch blade 30 can be traced from the line wire 22 through the heating element 20, the switch blades 30 and 50 and the contacts 60a and 58a back through the heater 54 to the line wire 24.

The bimetal blades 52a and 62a are adapted to warp downwardly in Figure 9 instead of upwardly as in Figure 8, for thus separating the contacts 58a and 60a upon a predetermined energization of the element 54 affecting the temperature responsive timer element 52a. Upon separation the current from the switch blade 30 will flow through the elements 30a, 66, and 70a to the heater 54, thus energizing the heater 70a in series with the heating element 20 instead of in parallel with it as in Figure 8. Otherwise the operation of the switch shown in Figures 7 and 9 is the same.

The elements 64 and 62a in Figures 7 and 9 are connected in a little different manner than shown in Figures 2 and 8, but the element 62a responds laggardly to the temperature of the element 70a through the heat conducted from one to the other, the degree of heat, however, being decreased somewhat by the connection 83a used in these two figures.

While I have herein shown and described my invention as embodied in a control mechanism of a specific character and applied to the operation of an electric bread toaster, it is to be understood that my invention is adapted for many other uses, and that various changes in the construction employed may be made by those skilled in the art without departing from the spirit and scope of the invention as disclosed in the appended claims. I desire particularly to point out that the source of heat for actuating certain of the thermal elements may in some cases be derived from other sources as, for example, the primary heat source, and that in certain aspects the invention is not limited to the enclosure of the control mechanism in the base or other casing disposed in close proximity to the primary heat source. Also, it will be understood that my invention may be applied to the control of devices or apparatus of various kinds and character in which it may be necessary or desirable to compensate only for the heat generated in one cycle of operation of the thermal relay to insure proper operation thereof in a succeeding cycle or cycles.

I claim as my invention:

1. In a timer for electric appliances, a normally open switch, manually operable means for closing said switch, a latch for latching said switch in a closed position and means for releasing said latch comprising a temperature responsive timer element, a heater therefor operable while said switch is closed, a contact carried by said timer element, a second contact for cooperation therewith, a second heater for releasing said latch and rendered operable by positioning of said contacts upon a predetermined temperature affecting said timer element and a temperature responsive compensating element for modifying the relative positions of said contacts, said compensating element having a limited heat conducting connection with said latch whereby to respond laggardly to the temperature generated for releasing the latch.

2. In a device of the class described, a normally open switch, means for manually closing said switch, a latch for latching said switch in closed position and means for releasing said latch comprising a temperature responsive timer element, a heater therefor operable while said switch is closed, a contact carried by said timer element, a second contact engageable thereby upon a predetermined temperature affecting said timer element, a second heater for releasing said latch and rendered operable by said contacts while engaged, a temperature responsive compensating element for moving said second contact away from said first contact, and a temperature responsive latch position compensating element carried by said latch and movable upon being affected by temperature toward latching position, said compensating elements responding laggardly to the temperature generated for releasing said latch.

3. For use with an electric appliance having a heating element, a switch in series with said heating element, means for manually closing said switch, a latch for latching said switch in closed position and means for releasing said latch comprising a temperature responsive timer element, a heater therefor in series with said switch and heating element, a contact carried by said timer element, a second contact for cooperation therewith, a second heater operable at the completion of an operation of said appliance for releasing said latch and rendered operable by positioning of said contacts upon a predetermined temperature affecting said timer element and a temperature responsive compensating element for modifying the relative positions of said contacts, said compensating element having limited heat conducting connection with said second heater to thereby respond laggardly to the temperature generated for releasing said latch.

4. In an electric bread toaster or the like adapted to be operated at intervals in quick succession, in combination, an operating circuit for the toaster, a switch adapted when operated to close said circuit, latch mechanism for holding said switch in circuit closing position, and timing means for controlling said latch mechanism comprising a pair of spaced intermittently cooperating elements, and means operable in each successive operation of the apparatus to vary the relative spacing of said elements during the next succeeding cycle in accordance with variations in the condition of the toaster, said last means including a heater for one of said cooperating elements, said one of said elements being thermally responsive thereto at the completion of each cycle of operation of said bread toaster and having an indirect heat conducting connection therewith.

5. In an electrical appliance adapted to be operated at intervals in quick succession, in combination, a manually closable control switch for the apparatus, and timing means for operating said switch comprising first and second thermal responsive elements operable to open said switch, and a heater for actuating said elements, said heater encircling said first element and said second element being connected to said first element whereby said heater is operative to actuate the second element in retarded relation to the actuation of the first element to permit immediate reclosure of the control switch for the next cycle of operation and control by said timing means.

6. In an electrical appliance adapted to be operated at intervals in quick succession, in combination, a control switch for the apparatus, and timing means for controlling said switch comprising a first thermal element bendable in one direction for actuating the switch, a second thermal element operative by bending in the opposite direction to compensate for the overrun of the first element and permit substantially immediate reoperation of the appliance, and a heater for operating said elements, said heater being adjacent said first element, said second element being connected to said first element and spaced from said heater whereby it is operated in retarded relation to the operation of the first element.

7. For use with an electric appliance having an electrically operated element, a switch in series with said element, means for manually closing said switch, a latch for latching said switch in a closed position, temperature responsive releasing means including a heater thereadjacent and operable to release said latch and a compensating element carried by said latch to receive heat therefrom, said compensating element thereby responding laggardly to the temperature of said heater, said compensating element being moved toward latching position by such response.

8. A control mechanism adapted for periodic operation comprising, in combination with a part to be operated, a thermally actuated member operative to control the operation of said part, a heater for said member, and a timing mechanism for controlling the energization of said heater including a pair of cooperating elements, one of said elements being movable through a predetermined distance to operatively engage the other element and said other element being connected with said member and spaced from said heater whereby it is operated by the heater in retarded relation to the operation of said member to progressively vary the distance between the elements in successive operations of said part.

9. In an electrical appliance having an electrically operated element and an energizing circuit for the element, in combination, a switch for closing the circuit to energize the element, latch means for holding said switch in circuit closing position, and temperature responsive timing means for actuating said latch means comprising a quick acting element adapted to move the latch means out of holding position and a slow acting element adapted to move the latch means toward holding position to compensate for the overrun of said quick acting element.

10. In an electric appliance adapted to be operated in one or a plurality of successive cycles, in combination, a source of heat for heating said appliance, a casing disposed in proximity to said heat source so as to be heated thereby, and control means located in said casing comprising a thermal element operative in each cycle to control said heat source, manually operable means for adjusting the position of said thermal element to determine the action thereof in the initial operating cycle of the appliance, and means for automatically modifying the action of said thermal element in succeeding operating cycles of the appliance to compensate for variations in the temperature of said casing, said last means including a thermally responsive member and a heater therefor, said member being arranged relative to said heater whereby the heat of the heater affects the member only after the completion of an operating cycle of the appliance.

11. In an electrical appliance having an electrically operated and an energizing circuit for the element, in combination, a switch for closing the circuit to energize the element, manually actuated means for operating said switch to circuit closing position, latch means for holding said switch in circuit closing position, manually actuated means for releasing said latch means, and temperature responsive timing means for releasing said latch comprising a heater, a quick acting element directly responsive thereto and thereby adapted to move the latch out of holding position and a slow acting element indirectly responsive to said heater and thereby adapted to move the latch toward holding position to compensate for the overrun of said quick acting element.

12. In a device of the class described, a normally open switch, means for manually closing said switch, a latch for latching said switch in closed position, and means for releasing said latch comprising a temperature responsive timer element, a heater therefor operable while said switch is closed, a contact carried by said timer element, a second contact engageable thereby, a second heater for releasing said latch and rendered operable by said contacts while in one position, said position being assumed upon a predetermined temperature affecting said timer element, a temperature responsive compensating element for moving said second contact relative to said first contact to effect quicker operation of said timer element upon said compensating element responding to a higher temperature, and a temperature responsive latch position compensating element carried by said latch and movable upon being affected by temperature toward latching position, said compensating elements responding laggardly to the temperature generated for releasing said latch.

13. In a device of the class described, a normally open switch, means for manually closing said switch, a latch for latching said switch in closed position, and means for releasing said latch comprising a temperature responsive timer element, a heater therefor operable while said switch is closed, a contact carried by said timer element, a second contact normally engaged thereby and separable therefrom upon a predetermined temperature affecting said timer element, a second heater for releasing said latch and rendered operable by said contacts while disengaged, a temperature responsive compensating element for moving said second contact toward said first contact, and a temperature responsive latch position compensating element carried by said latch and movable upon being affected by temperature toward latching position, said compensating elements responding laggardly to the temperature generated for releasing said latch.

14. In a device of the class described, a normally open switch, means for manually closing said switch, a latch for latching said switch in closed position, and means for releasing said latch comprising a temperature responsive timer element, a heater therefor operable while said switch is closed, a contact carried by said timer element, a second contact normally engaged thereby and separable therefrom upon a predetermined temperature affecting said timer element, a second heater for releasing said latch and rendered operable by said contacts while disengaged, a temperature responsive compensating element for moving said second contact toward said first contact, said compensating element responding laggardly to the temperature generated for releasing said latch whereby residual heat thereof in one cycle of operation of said switch modifies the position of said contacts in the next cycle of operation thereof.

JOSEPH E. BROSSEAU.